United States Patent
Jöckel

(10) Patent No.: US 8,622,002 B2
(45) Date of Patent: Jan. 7, 2014

(54) RAIL VEHICLE WITH INDIVIDUAL WHEEL DRIVES

(75) Inventor: Andreas Jöckel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 291 days.

(21) Appl. No.: 12/888,879

(22) Filed: Sep. 23, 2010

(65) Prior Publication Data

US 2011/0067596 A1 Mar. 24, 2011

(30) Foreign Application Priority Data

Sep. 24, 2009 (DE) .......................... 10 2009 042 870

(51) Int. Cl.
*H02P 5/68* (2006.01)
*B61C 3/00* (2006.01)

(52) U.S. Cl.
USPC .................. 105/61; 105/49; 318/41; 318/77; 318/85; 318/112; 318/705

(58) Field of Classification Search
USPC ........ 105/61, 49, 34.1; 246/122 R, 3; 701/19; 318/34, 41, 42, 73, 74, 77, 85, 112, 318/705, 709, 711
See application file for complete search history.

(56) References Cited

U.S. PATENT DOCUMENTS

| | | | |
|---|---|---|---|
| 5,364,047 A * | 11/1994 | Petit et al. ................. | 246/122 R |
| 5,374,933 A * | 12/1994 | Kao .......................... | 342/357.31 |
| 6,418,858 B1 * | 7/2002 | Hentschel et al. .............. | 105/61 |
| 6,868,793 B2 | 3/2005 | Hoffman et al. | |
| 6,876,162 B2 * | 4/2005 | Bilcke .............................. | 318/34 |
| 6,938,555 B2 | 9/2005 | Jöckel | |
| 7,633,205 B2 | 12/2009 | Hoffmann et al. | |
| 7,816,824 B2 | 10/2010 | Jöckel | |
| 2002/0101081 A1 | 8/2002 | Jöckel | |
| 2004/0011578 A1 | 1/2004 | Hoffmann et al. | |
| 2004/0222761 A1 | 11/2004 | Jöckel | |
| 2008/0036328 A1 | 2/2008 | Hoffmann et al. | |
| 2008/0309174 A1 | 12/2008 | Jöckel | |
| 2009/0234548 A1 | 9/2009 | Bergner et al. | |

FOREIGN PATENT DOCUMENTS

| | | |
|---|---|---|
| CH | 67 1377 A5 | 8/1989 |
| CN | 101092116 A | 12/2007 |
| CN | 201227996 Y | 4/2009 |
| DE | 41 35 691 C2 | 4/1998 |
| DE | 198 17 783 A1 | 11/1999 |
| DE | 198 26 452 A1 | 12/1999 |
| DE | 199 10 256 A1 | 9/2000 |
| DE | 101 17 031 A1 | 11/2002 |
| EP | 0 557 692 A2 | 9/1993 |
| EP | 0 583 001 A1 | 2/1994 |
| EP | 0 770 533 B1 | 5/2000 |
| EP | 1 247 713 A2 | 10/2002 |
| JP | 2003 237573 A | 8/2003 |
| WO | WO 9114596 A1 | 10/1991 |
| WO | WO 9212873 | * 8/1992 |

OTHER PUBLICATIONS

Lauf der Schienenfahrzeuge im Gleis; Hans-Ludwig Krugmann, Oldenbourg Verlag, 159-991-7; VT110;K105; Others.

* cited by examiner

*Primary Examiner* — Mark Le
(74) *Attorney, Agent, or Firm* — Henry M Feiereisen LLC

(57) ABSTRACT

A rail vehicle has a powered bogie, wherein the powered bogie has driven wheels. Each driven wheel of the powered bogie can be driven by an electric machine, with a power converter being assigned to the electric machine. As a result, a separate power converter is assigned to each driven wheel.

13 Claims, 3 Drawing Sheets

RAIL VEHICLE WITH INDIVIDUAL WHEEL DRIVES

CROSS-REFERENCES TO RELATED APPLICATIONS

This application claims the priority of German Patent Application, Serial No. 10 2009 042 870.4, filed Sep. 24, 2009, pursuant to 35 U.S.C. 119(a)-(d), the content of which is incorporated herein by reference in its entirety as if fully set forth herein.

BACKGROUND OF THE INVENTION

The present invention relates to a rail vehicle with individual wheel drives.

The following discussion of related art is provided to assist the reader in understanding the advantages of the invention, and is not to be construed as an admission that this related art is prior art to this invention.

Rail vehicles have running gear such as, for example, motor bogies with wheel sets. The wheels of the rail vehicle are subject to wear depending on the quality of a piece of track and the profile of the piece of track with integrated bends.

It would be desirable and advantageous to provide an improved rail vehicle to obviate prior art shortcomings and to reduce wear of wheels and/or to realize a quiet running of the rail vehicle.

SUMMARY OF THE INVENTION

According to one aspect of the present invention, a rail vehicle includes a powered bogie having wheels, plural electric machines for driving the wheels of the bogie in one-to-one correspondence, and plural power converters operably connected to the electric machines in one-to-one correspondence so as to assign to each of the wheels a separate one of the power converters.

A rail vehicle can be, for example, a tram, a light railway, an interurban railway, a tractive unit, a locomotive etc. Trams and light railways can be configured as a low-platform railway. The tram or the light railway can be embodied as a 100% low-platform railway. The tram or the light railway can be embodied, in particular additionally, with individual driven wheels. In this context, the classic motor bogie with wheel sets is dispensed with wherein the individual wheels can each be driven independently by means of an electric machine.

A rail vehicle has a powered bogie. A powered bogie can be, for example, a bogie or a device to which driven wheels of the rail vehicle are mechanically attached or coupled. The powered bogie has driven wheels, wherein each driven wheel is driven individually. Consequently, case an electric machine does not drive two wheels. If each driven wheel is driven individually, each individually driven wheel of the powered bogie can be driven by means of an electric machine, wherein a power converter is assigned to the respective electric machine. The power converter is, for example, a power inverter or a converter. Consequently, with the assignment described above a separate power converter is also respectively assigned to each individually driven wheel of the powered bogie.

Individually driven wheels increase the flexibility as to how these wheels can be regulated in their movement by means of the electric machines.

If the individual wheels are not rigidly coupled, an advantage can be obtained, in particular in tight bends. In the straight section of track it is necessary to pay attention to the running of the individual wheel bogies and also to the wear. In wheel sets, the wheels which lie opposite one another are rigidly coupled, which can provide an advantage on a straight section of track with respect to expected wear. In the case of an individual wheel bogie, since there is a lack of a wheel set shaft individually driven wheels which lie opposite one another are advantageously coupled electronically. The wheel set shaft can therefore be simulated electronically. This may be brought about, for example, by means of synchronization of the angles of two driven wheels lying opposite one another. In order to bring this about, the individual control systems of the electric motors of the driven wheels, adjust, for example, to a common on-going position. A wheel can also be defined, for example as a master, wherein the other wheel is a slave which follows an angular position or a position of the master.

In the case of individually driven wheels, permanently excited synchronous driving motors which can be controlled independently can be used. These driving motors are to be assigned, in particular, to a powered bogie. For example, four wheels and therefore four independently controllable permanently excited synchronous driving motors are assigned to one another. The wheels which are assigned to one another are assigned to the powered bogie, wherein this bogie constitutes at least one possible assignable way of attaching the assigned wheels.

In addition to the traction (starting off and braking), open-loop/closed-loop control of a motive power unit on the track can therefore be implemented in an improved way in terms of wear and noise.

Guidance of a motive power unit on the track can be carried out passively by means of the wheel/rail forces, i.e. in a way which is subject to wear. In the case of a drive concept with a longitudinal drive which is coupled to a beveled gear drive, it is not possible to provide individual support of the lateral guidance by means of drive torques. However, if the wheels are driven individually, individual support of the lateral guidance is possible.

According to another advantageous feature of the present invention, plural control systems can be operably connected to the wheels in one-to-one correspondence so as to assign to each of the electric machines a separate one of the control systems. Each control system can have, for example, at least one of the following types of controller:

a current controller,
a speed controller,
a position controller,
etc.

The control system which is assigned to the respective wheel is assigned to the respective electric machine. The control system therefore controls the electric machine, and since the electric machine is mechanically coupled in each case to just one wheel (in particular rigidly coupled via a shaft) the control system also serves to control the corresponding wheel.

According to another advantageous feature of the present invention, the control systems of a powered bogie may have a common synchronizing clock. This facilitates synchronization of the individually driven wheels.

According to another advantageous feature of the present invention, the control systems may have a data-transmitting connection to a system bus. The system bus advantageously also serves to synchronize the individually driven wheels. If the control systems of a powered bogie are synchronized with the system bus, synchronization with a superordinate open-loop/closed-loop control system of the rail vehicle can also be effected. The system bus advantageously also has, for example, a data-transmitting connection to a man/machine interface or also to a communication system for transmitting data to a rail vehicle control center.

According to another advantageous feature of the present invention, the powered bogie has two wheels which are positioned opposite one another and are to be assigned to different rails (one track has at least two rails), wherein a separate position signal generator, or a signal generator whose output signal can be used as a position actual value, is assigned to each of the wheels lying opposite one another and/or to the assigned electric machines. Advantageously, a position signal is used in just one wheel of the wheels which lie opposite one another, with the result that a corresponding measuring device also only has to be provided in this wheel.

According to another advantageous feature of the present invention, the powered bogie has two wheels which are positioned opposite one another and are to be assigned to different rails, wherein the movement of at least one of the two wheels can be controlled by a position controller. For example, a rigid axis, as in the case of a wheel set, can therefore be simulated. In the case of an entire train, a simulated wheel set shaft can advantageously be generated as a control wheel set shaft, wherein individually driven wheels of a train (this is also to be understood, for example, as including a tram) are synchronized with the simulated control wheel set shaft.

According to another advantageous feature of the present invention, a lateral guidance device can be linked by data connection to the control systems for the individually driven wheels. The control systems can be coordinated by the lateral guidance device, wherein, for example, at least one of the following coordination functions can be achieved or carried out:
- electronic angular coupling of at least between two wheels;
- torque control of at least one wheel;
- route-data-dependent control of at least one wheel (this can take into account for example, bend radii, lengths of sections of track and also damage to track);
- control of at least one wheel as a function of the position of the rail vehicle, wherein, for example, a global positioning system is used for this; the rail vehicle can have for this purpose, for example, a GPS receiver whose received data are advantageously logically combined with route data.

According to another advantageous feature of the present invention, a control system of the respective individual wheel can be influenced, or a plurality of control systems of various individual wheels can be influenced simultaneously in parallel via the bus, by a man/machine interface which can be located, for example, in the rail vehicle or at a distance therefrom (as a remote control interface).

According to another advantageous feature of the present invention, the driven wheels of a powered bogie are assigned, with the respective power converter, to a common electric intermediate circuit. The intermediate circuit may have an intermediate circuit capacitor which is advantageously used as an energy buffer in order, for example, to buffer braking energy of the one driven wheel (engine brake) and to use the buffered energy, for example, to accelerate another wheel which is assigned to the same intermediate circuit.

According to another advantageous feature of the present invention, route data and/or global position data can be processed by the lateral guidance device, wherein the route data can advantageously be updated via a radio link to a data memory for route data.

According to another advantageous feature of the present invention, the rail vehicle can have a track bend traveling mode and a straight route section traveling mode. Depending on whether the rail vehicle is in a bend in the track or on a straight section of a route, the track bend traveling mode or the straight route section traveling mode is activated. For this activation or for this changeover it is possible to provide a traveling mode changeover device for changing between the track bend traveling mode and the straight route section traveling mode. The modes differ, for example, in that depending on the mode, certain selected driven wheels of a powered bogie are operated with another different control system (for example torque control, position control, speed control etc.) than other wheels of this powered bogie.

According to another advantageous feature of the present invention, a changeover between the traveling modes can take place as a function of route data and/or a global vehicle position.

According to another advantageous feature of the present invention, a changeover between the traveling modes may be made dependent on route data and/or global position data, wherein the position of the driven wheels with respect to one another is stored in the rail vehicle.

According to another advantageous feature of the present invention, torque control of a wheel may be activated during the changeover of the modes. The torque control can also remain active during the track bend traveling mode.

A drive system of a rail vehicle can be configured in such a way that:
- each individual wheel is driven by means of a separate electric motor (with or without transmission), i.e. is not mechanically coupled to the drive; the wheel motor of the individually driven wheel is advantageously a PM driving motor; and/or
- in the case of a set of four driven wheels, each individual wheel motor is fed via in each case one individual pulse-controlled power inverter, which can set the torque of the wheel motor freely independently of the three other wheel motors; and/or
- identification is carried out not only of a rotational speed but also of the mechanical position angle of each individual driven wheel by the mechanical-level (drive) controller or corresponding angular sensors; and/or
- the traction functions of driving and braking can be implemented by coordinated actuation of the drivable wheels; and/or
- a lateral guidance assistance system can be implemented by means of a superimposed control system, wherein this transmits, in addition to the traction requests, positive or negative torque setpoint values to the four wheel motors in order to assist the lateral guidance of the motive power unit in a low-wear fashion; and/or
- the lateral guidance assistance system knows the position of the motive power unit and the route section (straight route section, track bend etc.) from sensors (for example GPS, route section position signal generators, position sensors etc.) and from a route file which is stored in a computer.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
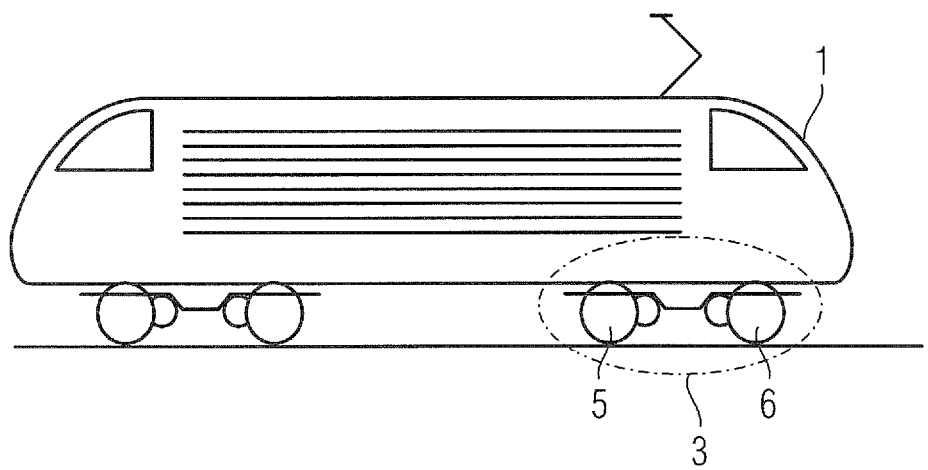
FIG. 1 is a schematic illustration of a rail vehicle having incorporating the subject matter of the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a rail vehicle 1 having incorporating the subject matter of the present invention. The rail vehicle 1 has a powered bogie 3, which is a pivoted bogie here. The powered bogie 3 has wheels 5 and 6.

Figure 2:
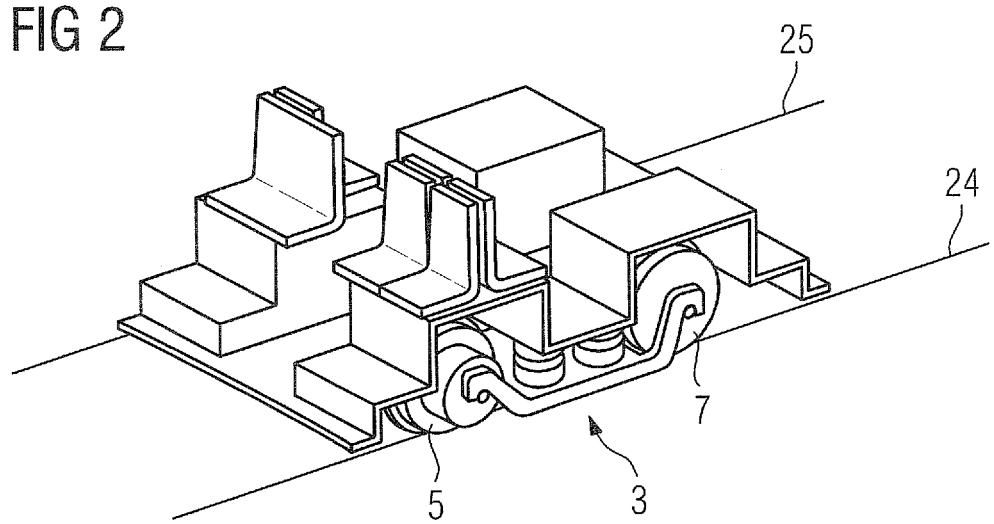
FIG. 2 is a basic illustration of a 100% low-platform set of running gear without a wheel set.

The illustration according to FIG. 2 shows a basic illustration of a 100% low-platform set of running gear without a wheel set. A powered bogie 3 with wheels 5 and 7 is illustrated, wherein rails 24 and 25 form a track.

Figure 3:
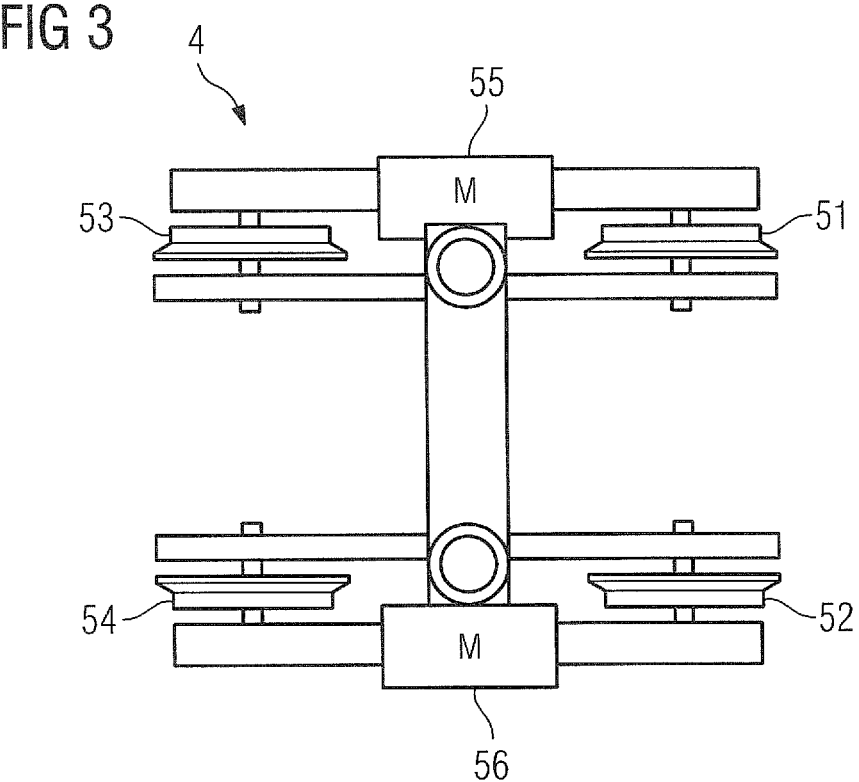
FIG. 3 is a basic illustration of a coupled longitudinal drive for a low-platform tram.

The illustration according to FIG. 3 shows a basic illustration of a coupled longitudinal drive for a low-platform tram. The latter has two electric machines 55 and 56 for driving the wheels 51, 52, 53 and 54 wherein the electric machine 55 is provided for driving the wheels 53 and 51, and the electric machine 56 is provided for driving the wheels 54 and 52. In this context, it is possible, for example, to use asynchronous wheel drives which are connected electrically in parallel to just one pulse-controlled power inverter. However, the degree of freedom of an individual controller for assisting the lateral guidance is therefore absent.

Figure 4:
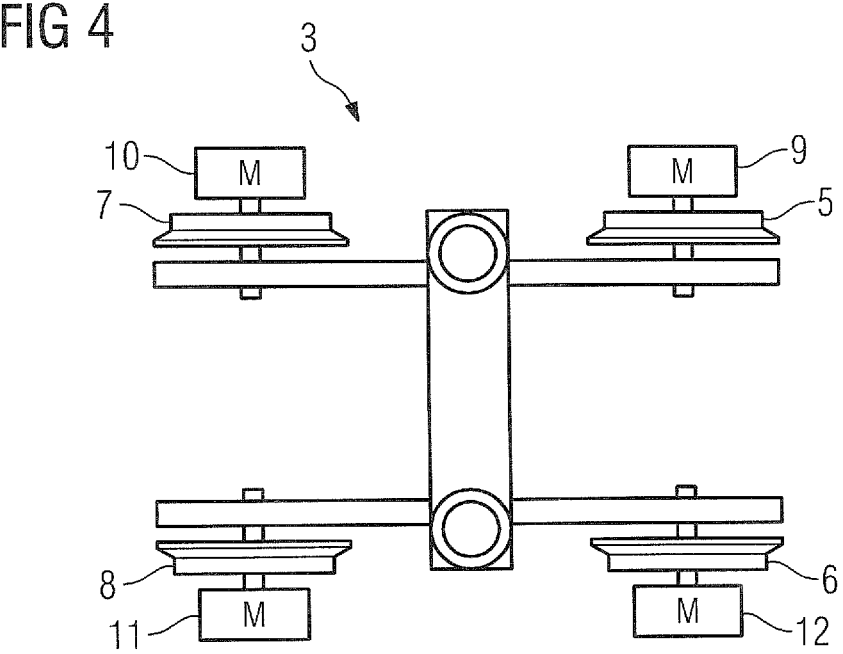
FIG. 4 is a basic illustration of an individual wheel motive power unit for a low-platform tram.

The illustration according to FIG. 4 shows a basic illustration of an individual wheel motive power unit 3 (powered bogie) for a low-platform tram. The latter has four electric machines 9, 10, 11, and 12 for respectively driving the wheels 5, 6, 7 and 8, wherein:

the electric machine 9 is provided for driving the wheel 5,
the electric machine 10 is provided for driving the wheel 7,
the electric machine 11 is provided for driving the wheel 8 and,
the electric machine 12 is provided for driving the wheel 6.

Figure 5:
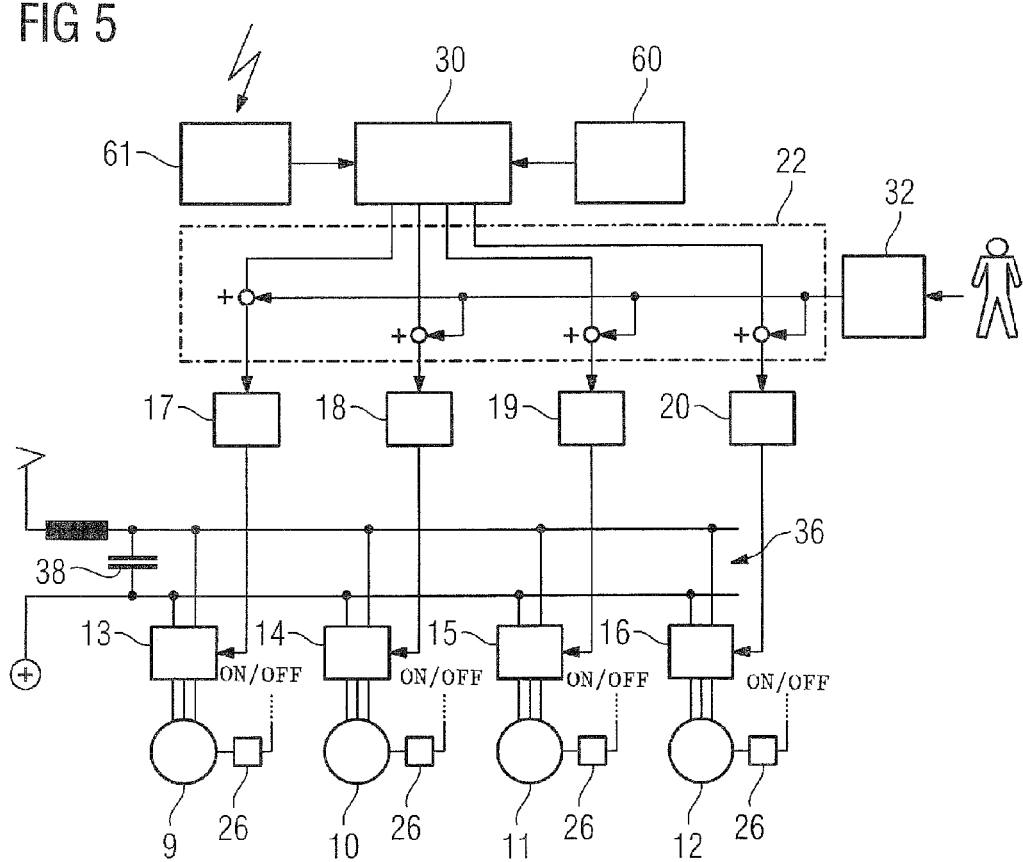
FIG. 5 is a basic illustration of a control architecture.

The illustration according to FIG. 5 shows a basic illustration of a control architecture with four electric machines 9, 10, 11 and 12. The four electric machines 9, 10, 11 and 12 are each assigned a signal generator 26. In addition, the four electric machines 9, 10, 11 and 12 are each assigned their own separate converter 13, 14, 15 and 16. The converters 13, 14, 15 and 16 have a common intermediate circuit 36, wherein the common intermediate circuit has an intermediate circuit capacitor 38. The inverters 13, 14, 15 and 16 are connected in a data-transmitting fashion to, in each case, one assigned control system 17, 18, 19 and 20. The signal generators 26 can also have a connection for this purpose. The control systems 17, 18, 19 and 20 are connected to a lateral guidance controller 30 via a data bus 22. Route data 60 and vehicle position data 61 can be fed to the lateral guidance controller 30 from, for example, a GPS receiver. A man/machine interface 32, which can be operated by a person is also connected to the data bus 22.

This concept may be used, for example, in individual wheel motive power units for low-platform trams. An advantage of the use may be that wear to the wheels and to the rails during operation can be reduced. This wear may make up a large part of maintenance costs (for example spinning of the wheel tires or grinding of the rails). In addition, reductions in running noise can also be expected. With this concept, there is no longer any need for tensioned transmissions, thereby significantly increasing the reliability of the drive.

In the concept it is possible to use individual control of PM driving motors (permanently excited synchronous machines) for individual wheel drive in such a way that a lateral guidance assistance system 30 supplements the rail vehicle. A position angle which is possibly present in the machine-level control can also be used for this assistance system 30. It is therefore possible to implement, for example in a straight route section, an angular coupling of the two wheels i.e. to emulate a wheel set shaft which, of course not only couples the rotational speeds but also the angles of the two wheels via a torque spring. In this case, it would also be possible to dispense with the position signal generators.

A genuine wheel set simulation can be implemented using software and then switched off again in a bend in the track. At the transition into the bend in the track the entry into the bend can be assisted in an optimum way in terms of wear by means of a specified torque value.

Figure 6:
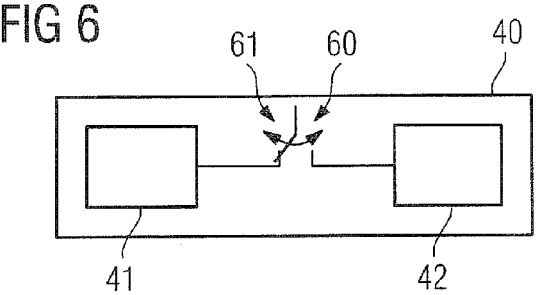
FIG. 6 is block diagram of a traveling mode changeover device.

The illustration according to FIG. 6 is a schematic view of a traveling mode changeover device 40 with which it is possible to changeover between the track bend traveling mode 41 and the straight route section traveling mode 42 as a function of route data 60 and position data 61. The changeover can be hard or else take place by means of a transition function.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A rail vehicle, comprising:
    a powered bogie having wheels;
    plural electric machines for driving the wheels of the bogie in one-to-one correspondence;
    plural power converters operably connected to the electric machines in one-to-one correspondence so as to assign to each of the wheels a separate one of the power converters;
    a common electric intermediate circuit having an intermediate circuit capacitor as an energy buffer, wherein all said plural power converters are operably connected to the common electric intermediate circuit;
    plural control systems using a common synchronizing clock and being operably connected to the wheels in one-to-one correspondence so as to assign to each of the electric machines a separate one of the control systems; and
    a system bus, wherein the control systems have a data-transmitting connection to the system bus and are synchronized on the system bus.

2. The rail vehicle of claim 1, wherein the bogie has two wheels positioned opposite one another and assigned to different rails, and further comprising a position signal generator or a signal generator assigned to the opposing wheels and/or to their assigned electric machines and generating an output signal in response to an actual position of the bogie.

3. The rail vehicle of claim 1, wherein the bogie has two wheels positioned opposite one another and assigned to different rails, and further comprising a position controller to control a movement of at least one of the two wheels.

4. The rail of claim 1, further comprising a lateral guidance device linked by data connection to the control systems and coordinating the control systems, wherein at least one of the following coordination functions is achievable:
    angular coupling of at least between two wheels;
    torque control of at least one wheel;
    route-data-dependent control of at least one wheel; and
    control of at least one wheel as a function of a position of the rail vehicle.

5. The rail vehicle of claim 1, further comprising a man/machine interface to influence simultaneously the control systems, each individually per wheel and/or jointly for a plurality of wheels.

6. The rail vehicle of claim 4, wherein the lateral guidance device is constructed to process route data and/or global position data.

7. The rail vehicle of claim 1, further comprising a track bend traveling mode operably connected to the wheels for causing the bogie to negotiate a bend in the track, and a straight route section traveling mode operably connected to the wheels for causing for the bogie to move on a straight section.

8. The rail vehicle of claim 7, further comprising a traveling mode changeover device activatable to change between the track bend traveling mode and the straight route section traveling mode.

9. The rail vehicle of claim 8, wherein the traveling mode changeover device is constructed to effect a changeover between the traveling modes as a function of route data and/or a global vehicle position.

10. The rail vehicle of claim 8, wherein the traveling mode changeover device is constructed to effect a changeover between the traveling modes in dependence on route data and/or global position data, wherein a position of the wheels with respect to one another is stored in the rail vehicle.

11. The rail vehicle of claim 7, wherein a torque control of a wheel is activated during a changeover between the traveling modes.

12. The rail vehicle of claim 3, wherein the position controller is configured to control the movement of the two wheels so as to simulate a rigid axis as control wheel set shaft between the two wheels and to synchronize individually driven wheels of the rail vehicle to the control wheel set shaft.

13. The rail vehicle of claim 1, wherein the control systems are configured so that one of the wheels is defined as master and another one of the wheels is defined as slave, and follows an angular position of the master.

* * * * *